United States Patent [19]

Lersmacher

[11] 4,287,025
[45] Sep. 1, 1981

[54] DEVICE FOR SOLID-STATE PYROLYSIS OF ORGANIC POLYMERIC SUBSTANCES

[75] Inventor: Bernhard Lersmacher, Aachen, Fed. Rep. of Germany

[73] Assignee: U.S. Philips Corporation, New York, N.Y.

[21] Appl. No.: 82,395

[22] Filed: Oct. 5, 1979

[30] Foreign Application Priority Data

Oct. 6, 1978 [DE] Fed. Rep. of Germany ....... 2843676

[51] Int. Cl.³ .................... C10B 1/04; C10B 27/00; C10B 27/06
[52] U.S. Cl. .................... 202/222; 201/25; 422/199; 422/202; 425/445; 432/13; 432/120
[58] Field of Search ............ 422/199, 202, 239, 307, 422/164, 167; 13/7, 20, 34; 432/13, 120; 425/445; 264/29.1–29.7, DIG. 46, 345; 202/217, 222; 201/25

[56] References Cited

U.S. PATENT DOCUMENTS

| 1,029,122 | 6/1912 | Heroult | 13/7 X |
| 1,133,259 | 3/1915 | Brown | 13/34 |
| 1,884,600 | 10/1932 | Derby | 13/7 X |
| 2,090,693 | 8/1937 | Melton | 13/7 X |
| 3,036,888 | 5/1962 | Lowe | 422/199 X |
| 3,042,493 | 7/1962 | Reuschel et al. | 422/199 X |
| 3,397,946 | 8/1968 | Beauchamp et al. | 422/199 X |

Primary Examiner—Bradley Garris
Attorney, Agent, or Firm—Norman N. Spain

[57] ABSTRACT

The yield of good-quality bodies consisting of vitreous carbon is increased to substantially 100% when the pyrolysis is performed in a reaction vessel in which a collecting container or a collecting disc for the condensable volatile decomposition products which is open at its upper side is arranged above the polymeric substances to be pyrolized. The collecting disc divides the interior of the reaction vessel into two parts, a passage for gases remaining between the upper part and the lower part. During the pyrolysis, a spatial temperature distribution is adjusted in the reaction vessel which results in a pulsating evaporation and condensation of the decomposition products, so that the decomposition products are completely removed.

13 Claims, 6 Drawing Figures

DEVICE FOR SOLID-STATE PYROLYSIS OF ORGANIC POLYMERIC SUBSTANCES

The invention relates to a method of converting natural and synthetic organic polymeric substances into carbon bodies by solidstate pyrolysis, also for the manufacture of vitreous carbon, where the polymeric starting substances to be pyrolized are subjected to a defined temperature/time treatment in a non-oxidizing atmosphere in a reaction vessel, and to a device in the form of a furnace for performing this method.

The term solid-state pyrolysis is to be understood to mean that the starting substances to be pyrolyzed, i.e. to be thermally broken down, in the instant case organic polymeric substances, are used in the solid state. The natural and synthetic organic polymeric substances, for example, cellulose and some derivatives thereof, phenoplasts, phenol formaldehyde resins, polyfurfuryl alcohol and polyvinylidene chloride, are converted into carbon by means of a defined temperature/time treatment, i.e. a heat treatment where the temperature is slowly increased. Among these conversions which are referred to as solid-state pyrolysis, technical importance has been gained notably by methods where essential characteristics of the starting substance, i.e. structural characteristic and external appearance, are maintained during the entire pyrolysis process, also referred to as carbonization, so that the geometry of the object is kept intact. The latter phenomenon will be illustrated with reference to two typical technically relevant examples.

When a yarn of regenerated cellulose of polyacrylonitrile is subjected, after a chemical/physical preparation, for example, after a heat treatment at 200°–250° C. during 20 hours in air, to a subsequent heat treatment in an inert atmosphere or in vacuum at a temperature of at least 750° C., but preferably at a higher temperature of up to 1000° C. or more, the original yarn consisting of a polymeric material is converted into a geometrically similar yarn which mainly consists of carbon only. This carbon yarn still has the fibril and bundle structure of the starting material to a high degree. A measurement reveals that only the linear dimension of the fibres has been reduced by thirty percent and more, depending on the starting material and on the preparation. This shape variation or volume reduction during the pyrolitic decomposition is accompanied, due to the release of the volatile constituents of the starting material (decomposition products), by a loss of weight which is dependent on the kind of polymeric starting material and on the execution of the pyrolysis process, for example, on the temperature increase in relation to the time, on the value and the duration of the final temperature. Thus, weight losses of from 30 to 80% related to the starting weight can occur.

When a body consisting of a duroplastic cured synthetic material, for example, a geometrically regularly formed piece of cured phenolic resin, is exposed to the above heat treatment, a carbon final product is formed which is known as vitreous carbon (Chem. Ing. Techn. 42 (1970) 659–669; Philips Technical Review 36, 1976, 93–103). The starting material is again converted into a geometrically similar body of vitreous carbon, accompanied by a linear, generally isotropic shrinkage.

The circumstances in which the carbonization can be suitably performed, that is to say with the desired result, are known, for example, from the above literature. However, substantially no detailed data are given therein concerning the equipment used. It is only stated, for example, in German Offenlegungsschrift 14 71 364, that the carbonization is performed in a furnace.

Investigations which have resulted in the present invention have revealed that the pyrolytic conversion of organic polymeric substances into carbon is difficult notably when comparatively large quantities are to be manufactured, for example, at a bulk scale, or when carbon bodies having a complex shape are to be manufactured. Complex shapes are shapes comprising substantial axial symmetry, such as profiled bodies with ribs or constructions, for example, flanges. These difficulties have two main causes:

1. A uniform and quasi-isothermal temperature (T) is required over a long period of time (t) and with comparatively large volumes, so $dT/dt \lesssim 0.1$ to $10°/h$; degree $T \approx 0$ in the reaction vessel which has a volume of approximately 10 liters in the case of the furnace used for the examinations.

The term quasi-isothermal is to be understood to mean that the temperature rise must be so slow that no or only small spatial temperature inhomogeneities occur in the reaction vessel.

2. The conversion of polymeric starting material into carbon is accompanied by the release of rather large quantities (up to 80% of the starting quantity) of volatile decomposition products which can condense for a substantial part.

If the conditions mentioned in sub 1 are not satisfied, deformations or cracks occur in the bodies which thus often become unusable.

The condensable decomposition products mentioned in sub 2 are liable to be deposited on the bodies to be pyrolyzed and may spoil or otherwise damage the surfaces thereof. The condensable decomposition products (usually oil-like and tar-like products) also have a particularly adverse effect on the contamination of the furnaces, thus necessitating very expensive and frequent cleaning and often giving rise to disturbances in the pyrolyses process for example, due to contamination of the elecrical connection, clogging of tubes, valves etc.

Objects of the invention are to obtain carbon bodies without cracks, notably in the case of production of rather large quantities of complex objects, to prevent the deposition of condensed decomposition products on the bodeis and in the furnace or in the reaction vessel, and is particularly to ensure a high efficiency of the conversion of starting products into optimum finished products.

These objects of invention are achieved by means of a method of the described kind where the atmosphere surrounding the polymeric substances to be pyrolized is heated in a part of the reaction vessel so that a quasi-isothermal condition exists therein; an atmosphere present above this atmosphere in an other part of the reaction vessel being heated so that the temperature therein decreases in the upward direction, the volatile decomposition products which condense in the upper atmosphere being intercepted above the polymeric substances to be pyrolized and being evaporated again.

For performing the method in accordance with the invention, use is preferably made of a furnace comprising a reaction vessel which can be heated and which is constructed as a cylinder or a prism with a vertical axis and which can be closed in a vacuumtight or gastight manner, the furnace being provided with a purging gas inlet and an outlet duct for the volatile decomposition products, the heating device being arranged and/or constructed so that an upper part of the reaction vessel either cannot be heated at all or only at a temperature which decreases step-wise in the upward direction, or can be heated to a lower temperature than a lower part of the reaction vessel which serves to accommodate the polymeric substances to be pyrolized, at least one collecting container or collecting disc for the condensable volatile decomposition products which is open on one side being arranged inside the reaction vessel above the polymeric substances to be pyrolized, the collecting container or the collector disc being constructed so that a passage for gases remains between the upper and the lower part of the reaction vessel.

The device in accordance with the invention for the pyrolytic conversion of bodies consisting of organic polymeric substances into carbon thus essentially consists of the following parts:

A reaction vessel or pyrolysis vessel, that is to say a divided chamber which can be sealed in a vacuum-tight or gastight manner, and in the lower part of which the starting material is thermally decomposed (pyrolysis or reaction vessel), A heating device, that is to say a heating vessel or heating device whereby the temperature of the lower part of the reaction vessel is as isothermally as possible raised to the final temperature (for example, 1000° C.) for a short or long period of time (up to 1000 hours) and can be maintained at this temperature.

A vacuum pumping installation or a purging gas installation which either evacuates the gases and the volatile constituents released by the material to be pyrolized or flushes away these constituents (convective purging gas flow) and which at the same time ensures that an inert, i.e. non oxidizing, atmosphere is maintained.

The device also includes an electrical control unit whereby defined temperature rise curves and cooling curves can be adjusted.

Further, it is very important that inside the reaction vessel at least one collecting container or collecting disc which is open at its upper side, for example, a metal collecting body for the condensable volatile pyrolysis product is provided above the polymeric substances to be pyrolized. This collecting container or collecting disc is constructed and arranged so that a passage for gases remains between the upper part and the lower part of the interior of the reaction vessel.

In a preferred embodiment of the invention, in order to enable easy filling and discharging of the furnace and to facilitate repair and cleaning, the heating vessel and the reaction vessel, that is to say the chamber for the polymeric substance to be carbonized, are arranged concentrically one inside the other so that they can be readily separated. The reaction vessel can thus be removed from the heating vessel.

The heating vessel in a further embodiment in accordance with the invention can be electrically heated. In such a way, the furnace which is suitably thermally insulated from the outside comprises, for example, a cylindrically wound heating system for the sides, and a bottom heating system.

The reaction vessel is made of, for example, heat resistant and corrosion resistant steel plate. In a preferred embodiment in accordance with the invention, the upper part of the reaction vessel projects outwards from the heating device. This means, for example, that the reaction vessel is situated inside the heating vessel over, for example, approximately $\frac{2}{3}$ of its total length, while its upper third part projects freely above the heating vessel.

The heating vessel is covered by a lid whereby the heating vessel can be closed in a gastight manner, for example, by means of clamps and a sealing ring.

In a further preferred embodiment in accordance with the invention, the upper part of the reaction vessel comprises cooling devices, for example, a water cooling system in the form of cooling ducts in the lid, or is provided with cooling water pipes (cooling coils) which are welded or soldered on the upper and lower side of the lid.

Some embodiments in accordance with the invention will be described in detail hereinafter with reference to the accompanying drawing.

Figure 1:
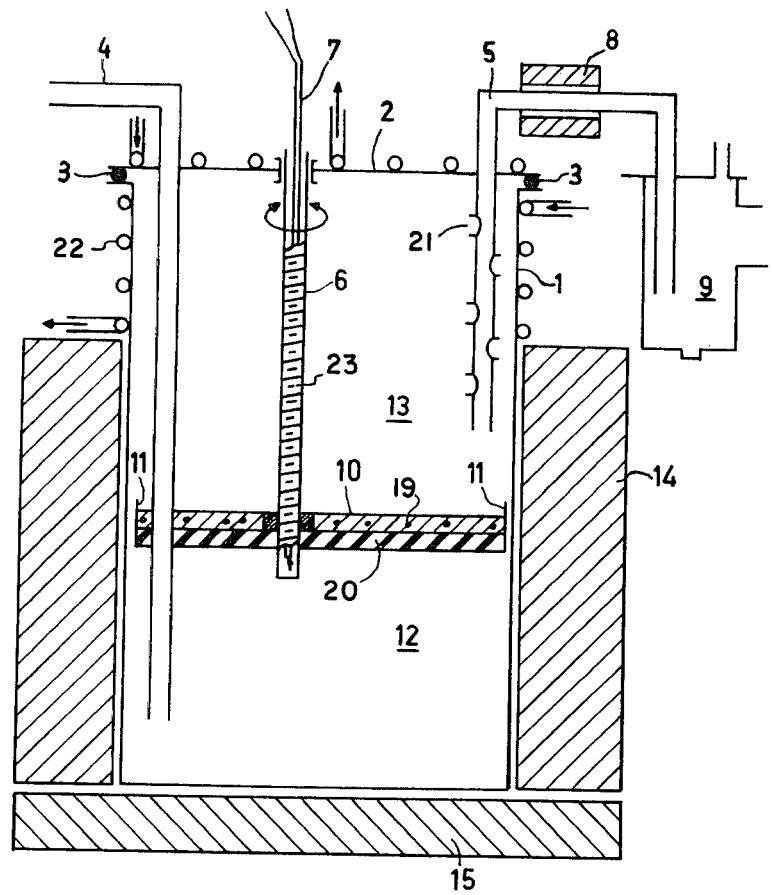
FIG. 1 is a cross-section of a device for solid-state pyrolysis, that is to say a pyrolysis furnace.

FIG. 1 shows a reaction vessel 1 which comprises a vertical wall, a horizontal bottom and an upper opening. The opening of the reaction vessel 1 is closed by means of a lid 2. A sealing ring 3 is provided between the top edge of the reaction vessel 1 and the lid 2. The following tubes extend through the lid to the interior of the reaction vessel: an inlet tube 4 for a purging and transport gas, for example, nitrogen, a discharge tube 5 for the transport gas with volatile decomposition products, and a protective tube 6 for a thermocouple 7. Outside the reaction vessel, the discharge tube 5 is surrounded by a heating device 8 and opens into a condenser pot 9. Inside the reaction vessel, a horizontally positioned disc 10 is connected to the inlet 4 tube and to the protective tube 6 for the thermocouple 7. The disc 10 may comprise an edge 11, so that it forms a pan-shaped container with an open top, and it may also be heatable by heating coil 19 embedded in the disc 10. Further the disc 10 may be supplied with an insulating layer 20 affixed to its undersurface. The disc 10 divides the interior of the reaction vessel 1 into a lower part 12 and an upper part 13. The width of the disc 10 is such that a passage remains between the lower part 12 and the upper part 13 at the right and/or the left thereof. The inlet tube 4 and the protective tube 6 for the thermocouple 7 extend into the lower part 12. The discharge tube 5 terminates in the upper part 13 and its wall may be provided with holes 21. The outer side of the reaction vessel 1 is provided with a surrounding heating device 14, for example, a cylindrical heating vessel, and with a bottom heating device 15, for example, an electrical heating plate.

In other embodiments of the wall and the bottom of the reaction vessel 1 the wall is constructed to be inclined, for example, to be conical and in that the bottom is bent outwards. Further the portion of the reaction vessel 1 above the heating device 14 as well as lid 2 may be cooled by means of water cooling ducts 22.

For performing a solid state pyrolysis, the reaction vessel 1 is filled with the polymeric starting material to be pyrolized so far that it more or less fills the lower part 12. The polymeric material to be pyrolized may be positioned directly in the reaction vessel 1, but is preferably arranged on a frame (not shown) or in a special container provided with holes, for example, a container made of a heat resistant metal (not shown). After the loading of the polymeric material to be pyrolized, the temperature in the reaction vessel 1 is increased by energizing the bottom heating device 15 and the wall heating device 14. The condensable decomposition products released preferably condense on the comparatively cold lower side of the lid 2 and on the comparatively cold wall of the reaction vessel above the wall heating device 14 during the pyrolysis. Condensable decomposition products are released as from a temperature of approximately 150° C. when the polymeric starting material, for example, has not yet been quantitatively cured. First water is released. The actual pyrolysis, that is to say the thermally activated dissociation of the molecular structure, starts at approximately 250° C. and terminates at approximately 800° C. The minimum temperature required for the pyrolysis of organic polymeric substances is thus given.

The heavier volatile constituents of the condensable decomposition products partly return along the walls of the reaction vessel 1 or drip onto the disc 10, i.e. on the collecting disc or into the collecting container. They thus arrive in the hotter zone of the reaction vessel 1 again and are evaporated again. As a result, a kind of pulsating evaporation and condensation takes place during given phases of the pyrolysis, approximately in the range between 300° C. and 700° C.

During operation, via the inlet tube 4 a purging gas (for example, nitrogen) is applied which on the one hand ensures an inert and non-oxidizing atmosphere and which on the other hand causes the volatile decomposition products released during the pyrolysis to be discharged via the discharge tube 5. The temperature of the electrical heating device 8 is adjusted so that separation of condensates in the discharge tube is prevented. Condensation of the volatile decomposition products takes place only in the condenser pot 9 which is connected, via a discharge flange, to either a suction pump or to the ambient atmosphere when operation takes place at atmospheric pressure. Because the reaction vessel is continuously flushed by purging gas during the entire pyrolysis process, all volatile decomposition products continuously formed at an increasing temperature are removed from the reaction vessel.

The thermocouple 7 serves for measuring and controlling the temperature, notably in the lower a vertical section 12.

Figure 2:
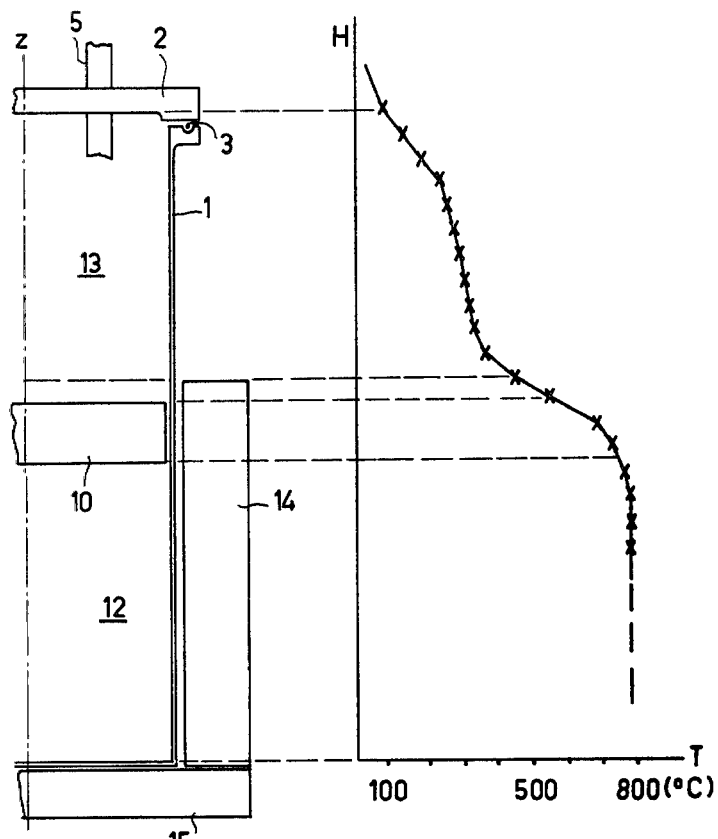
FIG. 2 shows the temperature variation that occurs in the pyrolysis furnace as shown in FIG. 1 during the operation, thereof.

FIG. 2 shows parts of the device of FIG. 1, along with a diagram of the spatial distribution of the temperature T measured at a pyrolysis temperature of approximately 800° C., at a given instant of the pyrolysis, along the dot dash line z in the reaction vessel 1, above the internal level H thereof between the bottom and the lid 2. The relationship between the temperature distribution and the height H, i.e. the situation of the bottom, of the disc 10, of the upper side of the heating device 14 and the lower side of the lid 2 is indicated by broken lines. The diagram shows that the temperature in the lower part 12 is constant, while the temperature in the upper part 13 above the disc 10 decreases with the level H of the reaction vessel 1, i.e. in the upward direction.

Thus, the reaction vessel is heated in a way so that a discontinuity in the temperature variation occurs above the polymeric material to be pyrolized, as measured along the line z (FIG. 2), preferably, along the central axis. This temperature variation is characteristic of the invention. This variation is brought about by separating the lower part 12 in which the pyrolysis takes place from the upper part 13 in which the pulsating condensation and evaporation of the volatile decomposition products takes place by the disc 10, i.e. by a collecting container or a collecting disc. The latter must be situated in the heated part of the reaction vessel so far that the evaporation of the volatile products condensating on the comparatively cold disc 10 is ensured. Notably in the case of vessel diameters in excess of, for example, 100 to 120 mm, it is attractive to heat also this disc or collecting container between the part 12 and the part 13 of the reaction vessel, because the required quasi-isothermal heating of the part 12 can thus be better realized.

The temperature distribution which is characteristic of the invention can be realized by those skilled in the art by taking given heating steps and by adjusting given geometrical relationships, for example, the distance between the collecting disc and the lid or the ratio of the overall length of the reaction vessel and the heated zone.

In an effective embodiment of the device in accordance with the invention, the collecting container or collecting disc 10 is arranged to be slidable for example along threaded sleeve 23.

For the heating of the reaction vessel, heating belts can be simply wound around the vessel. The kind of heating is of secondary importance. However, it is important that, in the case of electrical heating, no installation elements such as, for example, heat conductors, contacts, current inputs, etc., contact the reaction vessel so that volatile decomposition products can be deposited thereon. It has been found that such deposition not only causes substantial contamination of the interior of the reaction vessel, but also carbon bridges in the course of time, due to a kind of secondary pyrolysis, which may cause more or less hazardous short-circuits.

The homogeneity of the temperature distribution in the lower part 12 of the reaction vessel can be further improved by providing the disc 10 with an additional heating. In the case of a small diameter of the reaction vessel (up to approximately 10 cm), however, excellent pyrolysis can also be achieved by providing the plate with a few layers of thermal insulating material, for example, a few layers of graphite felt with an overall thickness of from 20 to 30 mm.

The advantages of the device in accordance with the invention for the manufacture of vitreous carbon can be summarized as follows:

1. When use is made of pyrolysis furnaces utilizing the method in accordance with the invention, the yield of usable material is increased from approximately 10% (when other furnace systems are used) to more than 90% and in most cases to even 100%.

2. The furnaces require substantially no maintenance. This means that condensate—even when viewed over a prolonged period of time—is separated only in or behind the condenser, so outside the reaction vessel.

3. The experiments which have led to the present invention have necessitated only sporadic repairs of the heating devices or the control unit, but the reaction vessels and the parts accommodated therein did not require any repairs; notably substantially no cleaning was necessary.

4. Due to the complete structural separation of reaction vessel and heating device, modifications, repairs etc. of any part can be simply performed and, for example, in the case of several similar installations of this type, the parts, i.e. the reaction vessels and the heating devices,

EXAMPLE 1

Cylindrical tubes having a length of 400 mm and an outer diameter of 22 mm and an inner diameter of 17 mm were cast and cured at 140° C. from a liquid phenol resol having an initial viscosity of from 3,000 to 5,000 cP, a specific weight of 1.22 gcm$^{-3}$ and a resin content of 74% using the method disclosed in German Offenlegungsschrift 2324605. The crude phenolic resin tubes were subsequently subjected to a heat treatment in a pyrolysis furnace of the described kind, that is to say to a temperature of 300° C. (measured in the reaction vessel) with a temperature increase of 4° C./h, in the range from 300° to 700° C. with 1° C./h, and from 700° C. to 1000° C. with 10° C./h, in a nitrigen flow of from 1 to 10 l/h and thus converted into a vitreous carbon. The cooling to the ambient temperature took place in 24 hours. During a special aftertreatment in a vacuum furnace, the tubes were subsequently heated to 1800° C. and cooled again within 48 hours. The vitreous carbon tubes thus obtained incurred a linear shrinkage of approximately 27% to an outer diameter of 16 mm and a length of 292 mm. The weight loss amounted to approximately 43% related to the initial weight. The surface of the tubes was very smooth, and the walls of the tube exhibited no cracks.

EXAMPLE 2

Approximately 100 square rods consisting of commercially available, non-filled phenolic resin (dekorit ® V 300a, Mssrs. Raschig) having starting dimensions of 4 mm×4 mm×100 mm (test rods) were subjected to a treatment similar to that of example 1. The yield of rods consisting of vitreous carbon amounted to substantially 100%. The linear shrinkage (variation of the cross-section and the longitudinal dimension) by carbonization amounted to between 18.75% and 20.0%. The weight losses related to the initial weight amounted to 42.6%.

EXAMPLE 3

Figure 3:
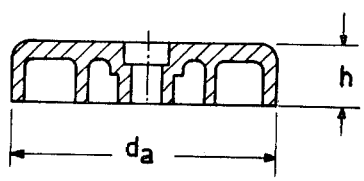
FIGS. 3, 4a and 5 show bodies formed of polymeric substances and a vitreous carbon.

80 Profiled bodies consisting of phenolic resin according to example 2 were manufactured on a lathe. FIG. 3 is a sectional view of such a profiled body; the outer diameter $d_a$ amounted to 45 mm, the height h to 12 mm. The profiled bodies were treated in the pyrolysis furnace described above with a temperature increase of 0.8° C./h to 850° C. The yield (the ratio of the number of bodies introduced and the number of carbonized bodies) amounted to substantially 100%. The bodies received an aftertreatment during 48 hours up to a temperature of 1800° C. in a vacuum furnace. The diameters $d_a$ decreased by 90% to 36 mm and the height h decreased by 20% to 9.6 mm. Bodies of this kind are used for given glass forming processes, notably for the manufacture of picture tubes.

EXAMPLE 4

Figure 4A:
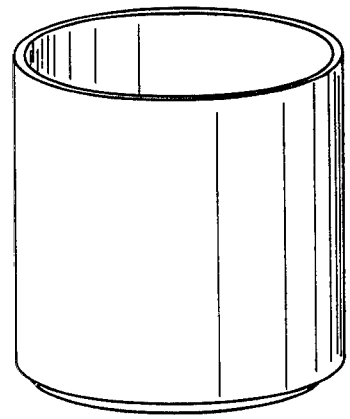
Figure 4B:
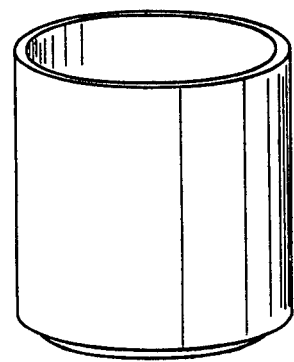
FIG. 4b shows a body similar to that shown in FIG. 4a after pyrolysis.

Analogously to the example 3, crucibles made of phenolic resin were converted into corresponding crucibles consisting of vitreous carbon (these crucibles are used for preparations in chemistry, the semiconductor technique and metallurgy). FIGS. 4a and 4b show the shrinkage. FIG. 4a shows a crucible consisting of cured phenolic resin and manufactured by milling; FIG. 4b shows a similar crucible after carbonization.

EXAMPLE 5

Figure 5:
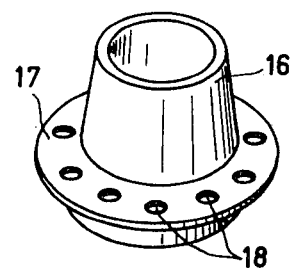

In accordance with the examples 3 and 4, implants for veterinary medical experiments were manufactured. First the bodies consisting of a solid, non-filled phenolic resin were mechanically manufactured, that is to say by lathing. FIG. 5 shows such a body, consisting of a cylindrical part 16 which is surrounded by a ring 17 provided with openings 18.

The bodies were cured to 200° C. in a drying cabinet, after which they were carbonized in the device in accordance with the invention at 0.8° C./h to 850° C., followed by an aftertreatment in vacuum from 1600° to 1800° C. within 48 hours.

Vitreous carbon implants of this kind are considered to have a very complex shape from a point of view of perfect carbonization.

What is claimed is:

1. A device for converting natural and synthetic organic polymeric substances into carbon bodies by solid state pyrolysis comprising:
    (a) a heatable, vertically positioned, elongated reaction vessel suitable for containing the polymeric substance to be pyrolyzed;
    (b) cover means for providing a gas-tight seal for said reaction vessel;
    (c) at least one solid collecting wall (10) positioned horizontally within said reaction vessel above the polymeric substance to be pyrolized, said collecting wall serving to divide said reaction vessel into a lower portion (12) containing the polymeric substance and an upper portion 13 wherein volatile decomposition products formed by pyrolysis of said polymeric substance are condensable on the upper surface of said collecting wall (10), said collecting wall (10) being so positioned as to leave a passage for gases between the lower and the upper portions of said reaction vessel;
    (d) an outlet (5) extending from the upper portion (13) of said reaction vessel for conducting decomposition products formed by pyrolysis of said polymeric substance away from said reaction vessel;
    (e) a purging gas inlet (4) extending through said reaction vessel into said lower portion (12) for introducing a gas into said lower portion (12) of said reaction vessel; and
    a (f) heating device arranged around said reaction vessel in a manner such that said lower portion (12) containing the polymeric substance is heatable under a quasi-isothermal condition with temperatures suitable for causing pyrolysis of the polymeric substance and only a section of said upper portion (13) extendingly upwardly in a vertical direction away from said collecting wall is heatable (10).

2. A device as claimed in claim 1, characterized in that the heating device (14, 15) is a heating vessel and that the reaction vessel (1) is removable from said heating vessel.

3. A device as claimed in claim 1 or 2, characterized in that the heating device (14, 15) is of an electrical type.

4. A device as claimed in claim 2 or 1, characterized in that the upper part of the reaction vessel (1) is provided with cooling devices.

5. A device as claimed in claim 2 or 1, characterized in that the collecting wall (10) is provided with a heat insulating layer.

6. A device as claimed in claim 2 or 1 characterized in that the collecting wall (10) is arranged to be vertically slidable.

7. A device as claimed in claim 2 or 1, characterized in that the outlet (5) is opened above the collecting wall (10).

8. A device as claimed in claim 2 or 1, characterized in that the outlet (5) is provided with a heating device (8) outside the reaction vessel (1).

9. A device as claimed in claim 2 or 1, characterized in that at least one temperature measuring device (6) is arranged inside the reaction vessel (1).

10. The device of claim 1 wherein the reaction vessel is cylindrically shaped with a vertical axis.

11. The device of claim 1 wherein the reaction vessel is prismatically shaped with a vertical axis.

12. The device of claim 1 wherein the cover means provides a vacuum-tight seal for said reaction vessel.

13. The device of claim 1 wherein the outlet (5) is provided with holes in its side wall.

* * * * *